United States Patent
Lindheimer (10) Patent No.: US 8,904,575 B1
(45) Date of Patent: Dec. 9, 2014

(54) PERINEAL SPRAY ATTACHMENT FOR TOILETS

(76) Inventor: Thomas Lindheimer, Lewisville, NC (US)

(*) Notice: Subject to any disclaimer, the term of this patent is extended or adjusted under 35 U.S.C. 154(b) by 544 days.

(21) Appl. No.: 12/458,679

(22) Filed: Jul. 20, 2009

Related U.S. Application Data (60) Provisional application No. 61/129,825, filed on Jul. 22, 2008.

(51) Int. Cl.
*A61H 35/00* (2006.01)
*B64C 1/10* (2006.01)
*B64D 1/00* (2006.01)

(52) U.S. Cl.
CPC .... *B64C 1/10* (2013.01); *B64D 1/00* (2013.01)
USPC .................................................. 4/447; 4/444

(58) Field of Classification Search
USPC ............... 4/420.1, 420.4, 443, 444, 447, 445
See application file for complete search history.

(56) References Cited

U.S. PATENT DOCUMENTS

| | | | |
|---|---|---|---|
| 2,852,782 A | 9/1958 | Sundberg | |
| 3,570,015 A * | 3/1971 | Rosengaus | 4/420.4 |
| 4,000,742 A * | 1/1977 | Digicomo | 604/83 |
| 4,041,553 A | 8/1977 | Sussman | |
| 4,197,594 A * | 4/1980 | Butterfield | 4/448 |
| 4,406,025 A | 9/1983 | Huck et al. | |
| 4,601,709 A | 7/1986 | Kabbaby | |
| 5,210,885 A | 5/1993 | Ruo | |
| 5,247,711 A | 9/1993 | Kwon | |
| 5,274,856 A * | 1/1994 | Bernard et al. | 4/420.4 |
| 5,331,692 A | 7/1994 | Alberti | |
| 5,384,919 A | 1/1995 | Smith | |
| 5,566,402 A * | 10/1996 | Agha el-Rifai et al. | 4/420.4 |
| 5,685,028 A * | 11/1997 | Miller et al. | 4/443 |
| 5,722,097 A * | 3/1998 | Deveer | 4/420.4 |
| 5,960,484 A * | 10/1999 | Shao | 4/420.4 |
| 6,006,372 A * | 12/1999 | Chang | 4/420.2 |
| 6,167,577 B1 * | 1/2001 | Hammad | 4/420.4 |
| 6,595,968 B1 | 7/2003 | Perrino | |
| 6,671,892 B1 * | 1/2004 | Plyant | 4/420.4 |
| 6,973,679 B1 | 12/2005 | Schad | |
| 7,065,802 B2 | 6/2006 | Jung | |
| 7,318,242 B2 | 1/2008 | Pace | |
| 2008/0118300 A1 * | 5/2008 | Burrowes | 401/270 |

OTHER PUBLICATIONS

USABIDET, Brochure, Model H-1, Installation Instructions, 2004, 1 Page.

* cited by examiner

*Primary Examiner* — Lauren Crane
(74) *Attorney, Agent, or Firm* — Dowell & Dowell, P.C.

(57) ABSTRACT

A perineal spray attachment for use with a conventional toilet seat and which is specifically designed to be mounted to the underside of the seat for manipulation by either right or left hand. The attachment includes a discharge nozzle mounted at an end of an arcuately shaped conduit that is rigidly secured to a combination control valve and handle that is used to move the nozzle from a non-deployed position immediately beneath a portion of the toilet seat to a deployed position generally centrally of the opening in the toilet sear. The attachment also includes an inline venturi injector for entraining cleansing and other topical agents into the fluid flow through the discharge nozzle. The handle incorporates a valve for controlling liquid flow to the nozzle and which valve is actuated by an individual's thumb after the nozzle has been manipulated to the deployed position.

20 Claims, 6 Drawing Sheets

PERINEAL SPRAY ATTACHMENT FOR TOILETS

CROSS REFERENCE TO RELATED APPLICATIONS

This application claims the benefit and priority of U.S. Provisional Patent Application Ser. No. 61/129,825, filed Jul. 22, 2008, in the name of the same inventor, the entire contents of which are incorporated herein by reference.

BACKGROUND OF THE INVENTION

1. Field of the Invention

The present invention is generally directed to personal hygiene attachments for use with conventional toilet seats and more specifically to a perineal cleaning attachment that includes a nozzle for discharging a liquid spray wherein the nozzle is manipulated between a non-deployed position, beneath a toilet seat remote from the opening therein, to a deployed position, generally centrally of the toilet seat opening, by a hand operable fluid flow control valve that also functions as a handle for moving the nozzle. The attachment may be selectively mounted to be operable from either the left or right side of the toilet seat when in use and further includes a venturi member for dispensing cleaning and other topical body treatment agents into the liquid spray.

2. Brief Description of the Related Art

Conventional bidets are modified toilet structures that issue a stream of water for purposes of cleaning a person's perineum area. Bidets have had wide spread acceptance in Europe and other countries and are now growing in popularity in the United States with many new homes and commercial lodgings providing such units as part of the accessories in a finished bathroom. Due to the large number of conventional bathrooms that do not include a bidet, bidet attachments have been proposed to permit conventional toilets to function both in their intended capacity and also as bidets. To accomplish this, a number of bidet attachments have been designed that may be mounted to existing toilet seats. The attachments are connected as branch flow lines from the plumbing pipes that are normally connected to fill supply tanks associated with toilets. The attachments further include one or more nozzles that may be selectively pivoted from positions remote from the openings in the toilet seats to positions generally centrally aligned with the openings in the toilet seats. Valves are incorporated with conventional bidet attachments for controlling fluid discharge as desired.

Some bidet attachments are somewhat awkward in that they require one handle for moving the nozzle or nozzles and a separate and spaced valve for controlling fluid flow. Other attachments are designed to be mounted to one side of a toilet seat and are thus difficult to use by individuals whose primary hand, or perhaps, only hand, is opposite to the side of the toilet to which the handle of the bidet attachment is positioned.

In many situations, it may be necessary for a nurse or other care provider to control the movement and liquid flow from a nozzle of a bidet device, and the design and structure of many conventional bidet attachments for toilets is not suitable for such assisted use. In addition to the foregoing, most bidet attachments for use with conventional toilets do not provide any simple and economical manner of allowing the liquid flow from the attachments to be entrained with body cleansing or topical treating agents, which may be beneficial in many situations for the comfort and/or health care of an individual.

In view of the foregoing, there is a need to provide a attachment that may be easily and quickly mounted to either a left or right side of a conventional toilet seat to provide a controlled flow of liquid to be supplied to clean and or treat the perineum area of a person in such a manner that the control of liquid flow can be perform simultaneously with the movement of a spray nozzle associated with the attachment and wherein, cleansing agents, irritation reducing agents and other topically applied body treating agents may be easily introduced into the liquid supply stream without the need for complicated dispensers or feeder pumps and the like.

SUMMARY OF THE INVENTION

Perineal cleansing attachments for use with conventional toilet seats each of which includes a nozzle mounted at an end of a curved conduit that extends from an L-shaped conduit portion which is attached or connected to a valve member that functions as a control handle for moving the conduit so that the nozzle may be selectively pivoted between a non-deployed position beneath a toilet seat, remote from the opening therein, to a deployed position generally centrally of the toilet seat. A spring member is mounted to the L-shaped portion of the L-shaped conduit for constantly urging the control valve handle to be in a position such that the nozzle is in the non-deployed position. The valve is also connected by way of a conduit to a source of liquid supply which may be a plumbing conduit which normally supplies water to a fill tank of the toilet or to some other source. Mounted along the handle or along a length of the supply conduit is a venturi feeder or injector which is designed to permit a supply container to be mounted thereto such that the contents of the supply container may be entrained into the liquid flow toward the nozzle.

It is a primary purpose of the invention to provide a structure for a perineal cleansing attachment for a conventional toilet that may be selectively mounted to either the left or right underside of a conventional toilet seat for manipulation by either the left or right hand of an individual seated on the seat or by a health care provider and which attachment is thus not limited to a single mode of mounting, as is the case with prior art bidet attachments.

It is also an object of the invention to provide a perineal cleansing attachment for toilets that includes a venturi injector for entraining cleansing and other topical treating agents into a liquid supply stream to the nozzle of the attachment without the need for complicated valves, pumps and the like.

BRIEF DESCRIPTION OF THE DRAWINGS

A better understanding of the invention will be had with reference to the accompanying drawings wherein.

DESCRIPTION OF THE PREFERRED EMBODIMENT

Figure 10:
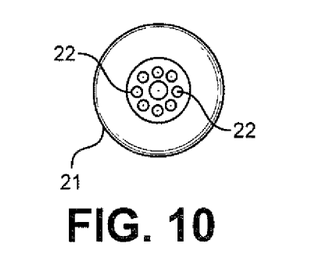
FIG. 10 is a view of the nozzle of the attachment taken along line 10-10 of FIG. 4.

With continued reference to the drawings, the perineal cleansing attachment 20 of the invention is shown in FIGS. 1-5 as being mounted to a right side and bottom surface of a conventional toilet seat "S". The seat defines an opening "O" above the bowl "B" of a conventional toilet. The toilet also includes a water supply tank "W" that is filled with water supplied through a shut off valve "V" and tank fill line "L". The attachment includes a spray nozzle 21 having one or a plurality of discharge openings 22, see FIG. 10, and which nozzle is mounted at an end of a curved outer portion 24 of a liquid discharge conduit 23 that includes a somewhat L-shaped portion 25 that extends to an agent feeder or injector 26 that is mounted so as to be in liquid flow communication with a control valve assembly 28 that also functions as a handle for pivoting the curved outer portion 24 of the discharge conduit 23 and thus the spray nozzle 21. The valve assembly includes a "T" fitting 30 that is connected to one end of a flexible water supply conduit 32 which is connected at its opposite end to another "T" fitting which communicates with the tank fill line "L".

Figure 1:
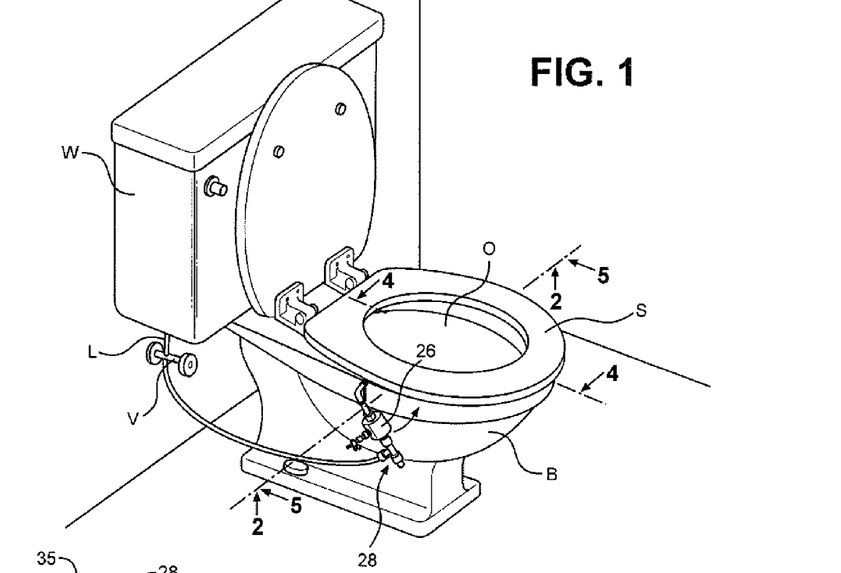
FIG. 1 is a front perspective view of a preferred embodiment of perineal cleansing attachment of the invention mounted to a right side and beneath a conventional toilet seat for manipulation by a person's right hand.
Figure 2:
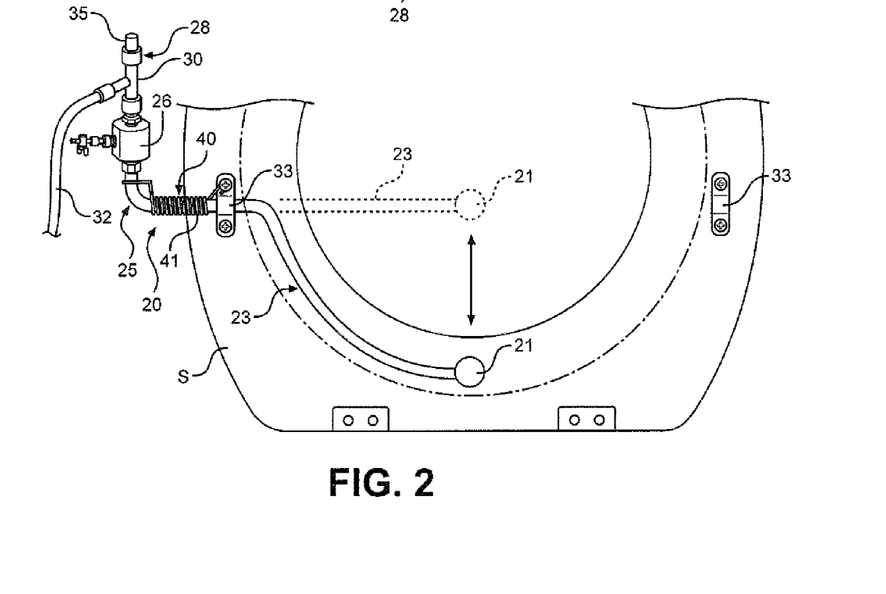
FIG. 2 is a partial bottom plan view taken along line 2-2 of FIG. 1 of the perineal cleansing attachment and toilet seat.
Figure 3:
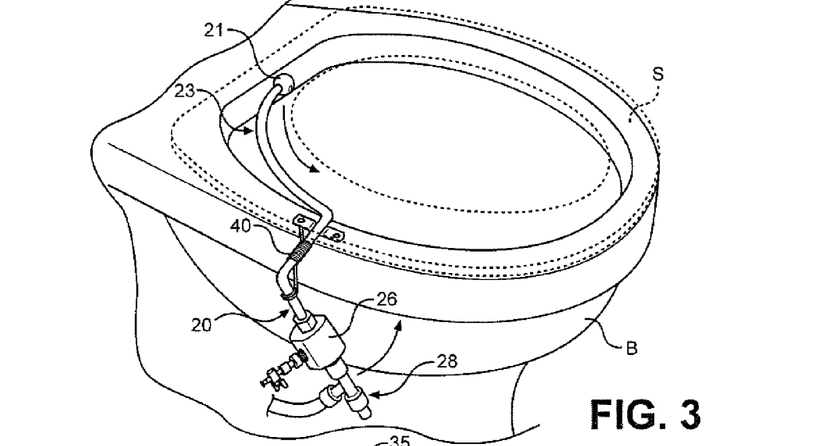
FIG. 3 is a partial top perspective illustrational view of the toilet seat and attachment shown in FIG. 1 with the toilet seat shown in dotted lines and the attachment shown in a non-deployed position wherein the nozzle associated with the attachment is spaced from the opening in the toilet seat.
Figures 4, 5:
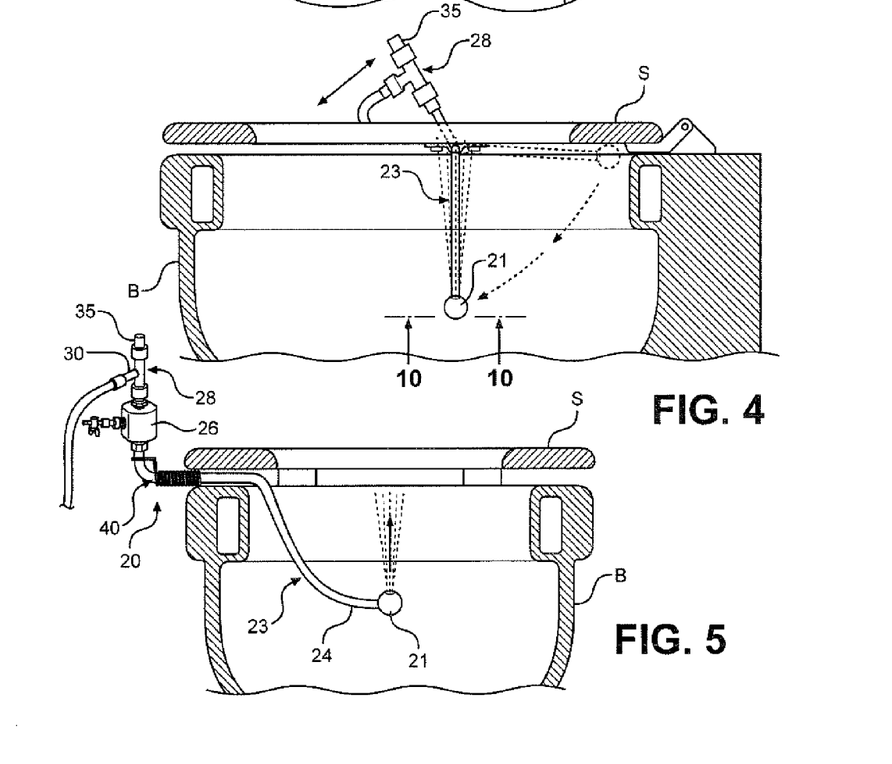
FIG. 4 is a cross sectional view taken along line 4-4 of FIG. 1 showing the perineal cleansing attachment being pivoted to a fully deployed position beneath the opening in the toilet seat.
FIG. 5 is a front cross sectional view showing the attachment taken along line 5-5 of FIG. 1 but with the nozzle being moved to a deployed position and illustrating a spray stream of water or a combination of water and topical treating agent.
Figure 6:
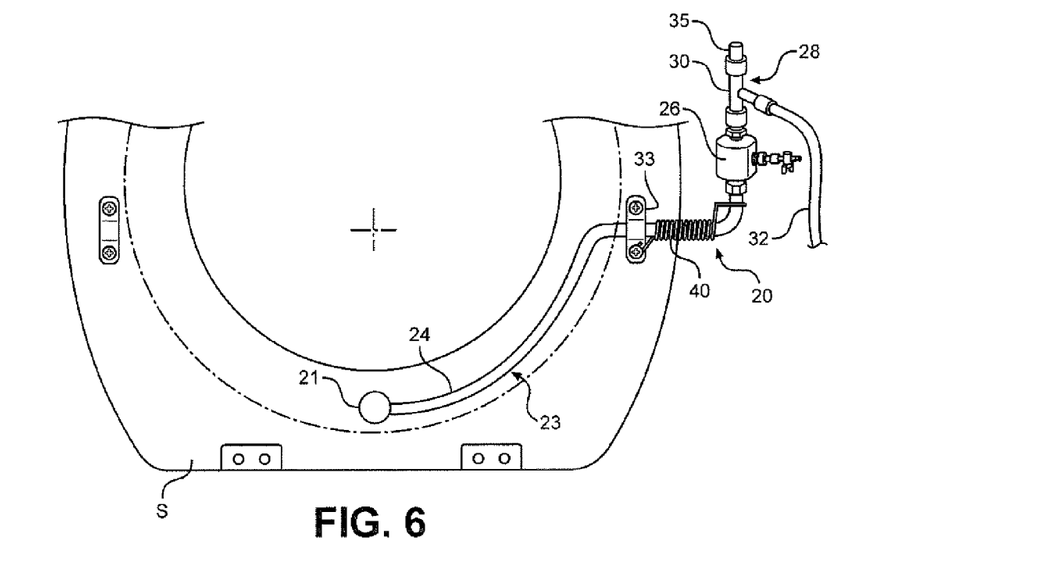
FIG. 6 is a partial bottom view showing the attachment being mounted beneath and to the left side of the toilet seat.

As shown in FIGS. 2 and 6, the liquid discharge conduit 23 is pivotally secured to the bottom of the toilet seat "S" by a u-shaped bracket 33 that is attached thereto using screws 34. In FIG. 2, the bracket is secured to the right side of the seat such that the control valve assembly 28 is easily accessible to a right hand of an individual seated on the seat "S" whereas, in FIG. 6, the bracket is secured to the left side of the seat such that the control valve is easily accessible with an individual's left hand. As shown in FIGS. 2, 3 and 6, the curvature of the outer portion 24 is concave toward the opening "O" in the seat and is also such that the nozzle is normally positioned in a non-deployed position beneath a rear portion of the seat, but is pivotally movable vertically downwardly and forward to a deployed position by manual manipulation of the handle and control valve assembly 28 so that the nozzle is positioned below and generally centrally relative to the opening "O" of the seat. By manipulation of the valve assembly and the simultaneous activation of a push button 35 associated with the valve assembly, a liquid spray may be directed along all or selected portions of the perineum area of the person seated on the toilet seat.

Figure 7:
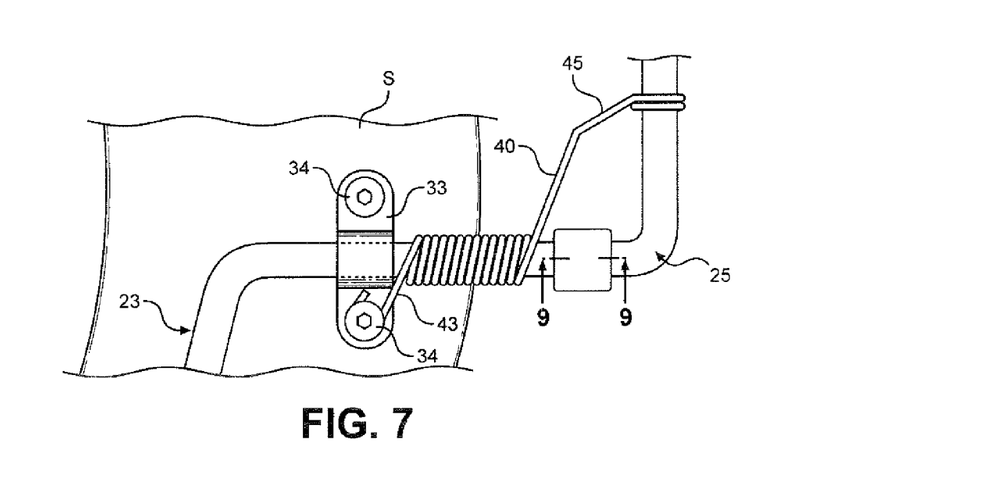
FIG. 7 is an enlarged view of the attachment as shown in FIG. 6 showing the manner in which the spring is mounted to urge the nozzle to the non-deployed position thereof.

The valve control assembly 28, that also functions as the operating handle for moving the spray nozzle, is normally urged to a position that will ensure the outer curved portion of the discharge conduit and the nozzle are in their non-deployed by a spring assembly 40. The spring assembly includes a coil spring 41 that is mounted about an outer portion of the L-shaped portion 25 of the discharge conduit 23 so as to be adjacent the u-shaped mounting bracket 33. The spring 41 has an inner end 43 that is secured to the u-shaped mounting bracket 33 by the screw 34, as in shown in FIG. 7. The spring also includes an opposite end 45, that is mounted about the other segment or section of the L-shaped portion of the discharge conduit. The tensioning of the coil spring is such as to continuously urge the nozzle to the non-deployed position shown in FIGS. 3 and 6. The positioning of the coil spring is simply reversed when the attachment 20 is mounted to the opposite side of the toilet seat as shown in FIGS. 6 and 7.

Figure 13:
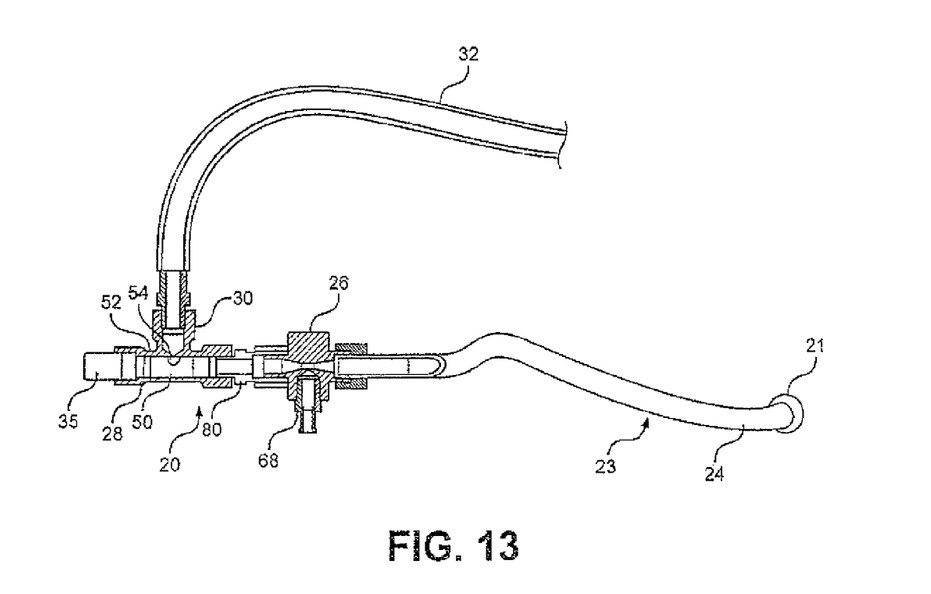
FIG. 13 is a cross sectional view taken through the handle, control valve and feeder or injector device of FIG. 11.

With reference to FIG. 13, the control valve assembly 28 includes the push button or knob 35 that is connected to a slide piston valve 50 mounted within a tubular valve housing 52. The slide piston valve has an open channel therein that communicates with the discharge conduit 23 and through a side opening 54 with the "T" fitting 30. A spring, not shown, within the valve housing normally urges the piston valve to a closed position wherein the opening 54 is sealed closed relative to the "T" fitting 30. By depressing the knob 35 against the slide piston valve as shown by the arrow, the opening 54 becomes aligned with the "T" fitting 30 so that water flows from the supply conduit 32 to the discharge conduit 23. When pressure on the knob 35 is released, the internal valve spring will move the slide piston valve back to its closed position.

Another beneficial feature of the present invention is that it is possible to entrain cleaning agents, topical body treating agents including anti-irritants, lubricants, medications and the like within the water flow to the discharge nozzle. To accomplish such an entrainment as easily as possible and without the need for powered metering or pumping devices, the invention includes the agent feeder or injector 26 that is mounted, in the preferred embodiment shown, downstream of the control valve assembly 28 and upstream of the L-shaped portion of the discharge conduit 23. With specific reference to FIGS. 11 and 13, the feeder includes a housing 60 having a fluid passageway 61 there through having a venturi section 62 that communicates with a side port 64. A dispensing container 68 is threadingly or otherwise mounted to the side port such that the contents thereof communicate with the venturi section 62 of the feeder or injector 26. As water or other liquid passed through the venturi, liquid or other cleansing or treating agent, is drawn from the container 68 into the liquid as the liquid flows toward the discharge nozzle.

Figure 11:
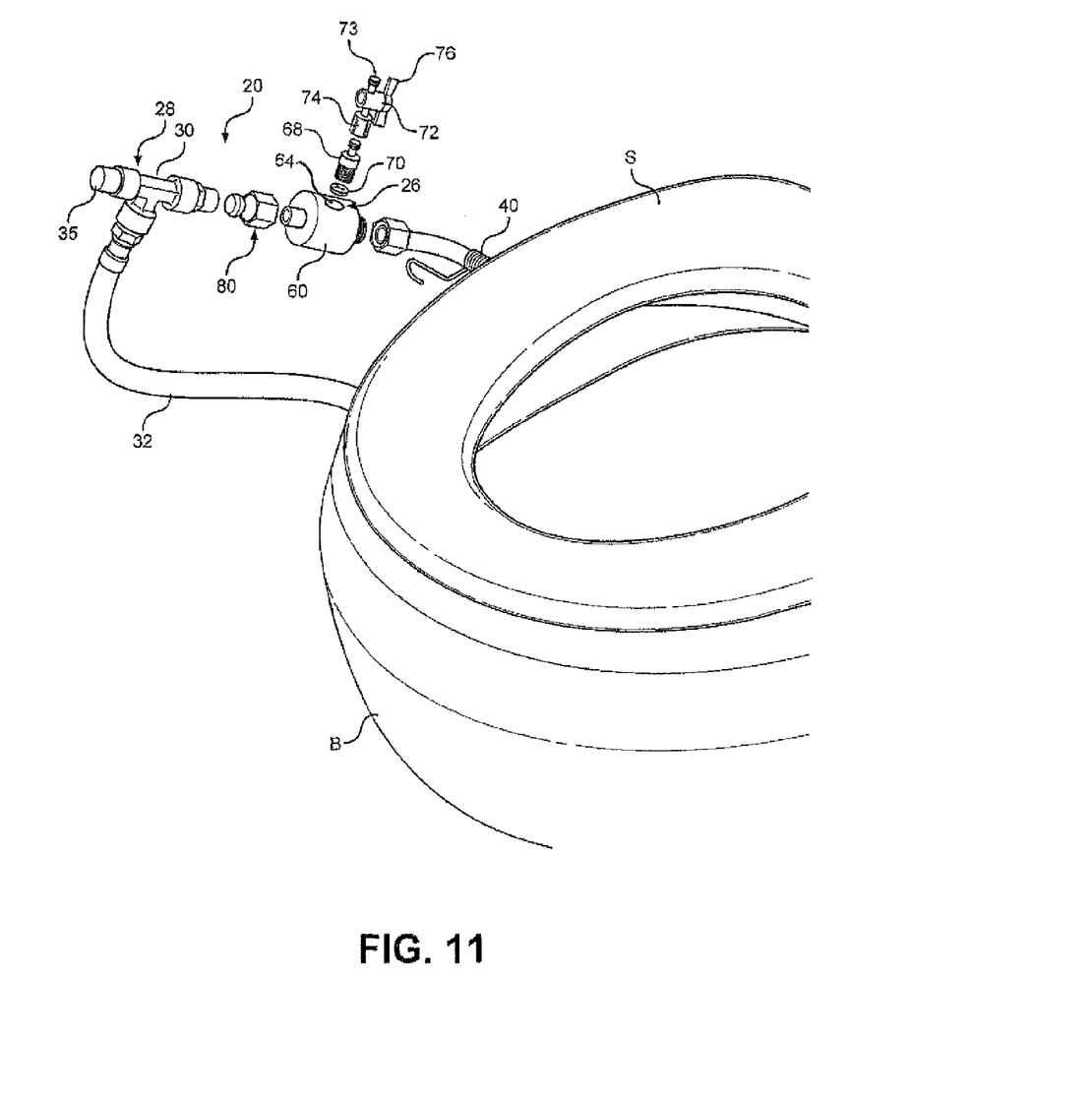
FIG. 11 is a perspective assembly view of the handle, control valve and feeder or injector device of the attachment.
Figure 12:
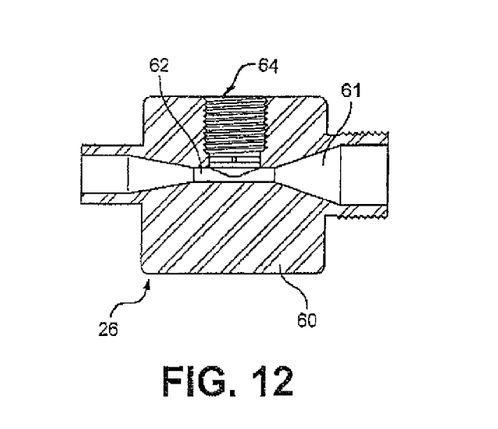
FIG. 12 is a cross sectional view through the feeder or injector device of FIG. 11.

In a variation of the feeder or injector 26, a pliable slit valve 70 may be mounted within the side port 64 so as to close the port and prevent contamination of the liquid channels within the feeder or injector whenever a dispensing container is removed from the side port.

The container 68 may be a dedicated container having product contained therein when purchased such that when the contents of the container are depleted, the container is disposable. In some instances the container may be a re-usable container that may be filled with any desired cleaning or body treatment agent. After use, the container may be cleaned and/or sterilized for subsequent use with the same or a different agent.

In FIG. 11 a separate metering valve 72 is shown having an inlet 73 and an outlet 74. The outlet 74 may be threaded or otherwise shaped to cooperatively seat with a neck portion 75 of the dispensing container 68 that may be threadingly engaged within the side port 64 of the feeder or injector 26. By manipulation of a handle 76 of the metering valve 72, a rate of supply of cleansing or other topical agent passing through the metering valve may be effectively regulated to the venturi of the feeder or injector 26.

Figure 8:
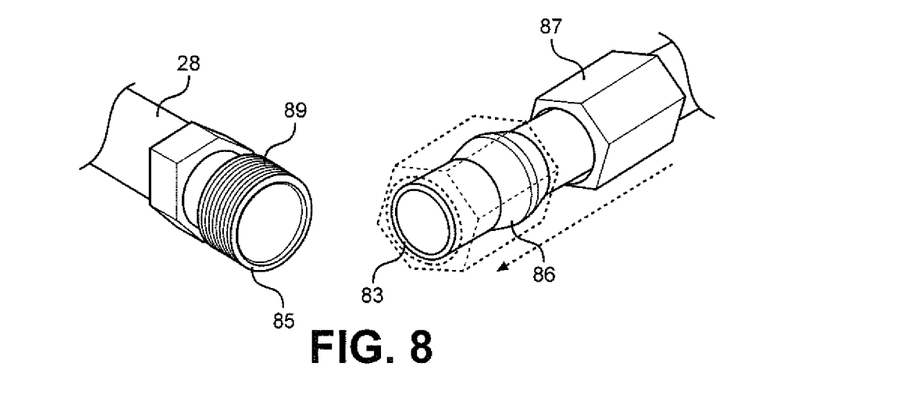
FIG. 8 is a cross sectional view of a compression swivel fitting that permits the conduit of the perineal cleansing attachment to be selectively oriented for either left or right mounting.
Figure 9:
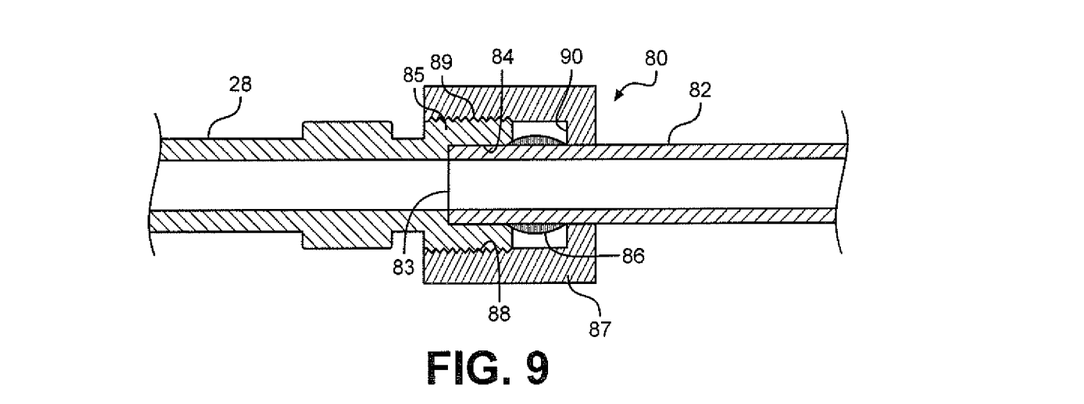
FIG. 9 is a cross sectional view of the assembled swivel fitting of FIG. 8.

One of the unique features of the invention is that the attachment may be selectively mounted to either side of the bottom of the toilet seat without having to change the physical components associated therewith. Thus a single attachment may be distributed that can be used by persons needing right hand control or left and control. In addition, in those instances wherein it is necessary for a health care provider to manipulate the control assembly which functions as a handle, the valve control assembly may be mounted to suit the preference of the provider. In order to allowing the same structure to be used for left and right hand mountings, a swivel fitting 80, see FIGS. 8, 9 and 11, is mounted between the handle and control valve 28 and the feeder or injector 26. The swivel fitting could also be mounted between the feeder or injector 26 and the liquid discharge conduit 23 and operate in the same manner.

The swivel fitting 80 permits the feeder 26 and the liquid discharge conduit to be rotated 180° relative to the handle and control valve assembly so that the discharge spray nozzle 21 is correctly orient in the deployed position centrally of the opening "o" in the toilet seat when the perineal cleansing attachment 20 is mounted to either the left or right side of the toilet seat. The swivel fitting includes a conduit 82 having a free end 83 that seats within a polished inner opening 84 of a discharge end 85 of the handle and control valve 28 so that the conduit may be rotated relative to the handle and control valve. To seal the connection, a bulbous seal 86 is friction fitted over the free end 83 of the conduit 82 after a female connector 87 is mounted to the conduit 82 adjacent the free end thereof. The female connector includes inner threads 88 that are cooperatively engaged with outer male connector threads 89 provided on the discharge end 85 of the handle and control valve 28. As the male and female connector threads are tightened relative to one another, the seal 86 is compressed between a base portion 90 of the female connector and the junction area surrounding the point of entry of the free end 83 of the conduit 82 into the discharge end 85 of the handle and control valve 28. By loosening the connection between the female connector and the discharge end of the handle and control valve, the conduit and other components of the perineal cleansing attachment 20 downstream thereof may be easily rotated relative to the handle and control valve.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A perineal treatment apparatus for use with a toilet seat having a seat portion having upper and lower surfaces and at least partially surrounding a central opening, the perineal treatment apparatus comprising; a discharge conduit including a spray nozzle, a bracket for pivotally mounting the discharge conduit to the lower surface of the toilet seat so that the discharge conduit is vertically pivotally movable from a first upper non-deployed position beneath a portion of the lower surface of the toilet seat to a second lower deployed position aligned below the opening in the toilet seat and so that no portion of the apparatus extends over the toilet seat, fastening means for removably mounting the bracket to the lower surface of the toilet seat such that the discharge conduit may be selectively mounted to a selected one of a right or left side of the toilet seat, a control valve assembly mounted to and in fluid communication with the discharge conduit, the control valve assembly forming a handle for pivotally moving the discharge conduit vertically in an arc between the non-deployed position and the deployed position thereof as the handle is pivoted vertically relative to one of the right or left side of the toilet seat, the control valve assembly including a valve for controlling a flow of liquid from a liquid input conduit to the discharge conduit, an agent injector connected in fluid communication with and between the control valve assembly and the discharge conduit so as to be pivotally movable therewith to supply cleaning and topical body treating agents into a liquid being supplied from the liquid input conduit to the discharge conduit, the control valve assembly including a valve actuation member for selectively opening and closing the valve of the control valve assembly, and wherein the discharge conduit and the control valve assembly are adjustably mounted to rotate relative to one another so as to be to be selectively rotated so that the discharge conduit and control valve assembly may be removably mounted to one of the right or left side of the toilet seat.

2. The perineal treatment apparatus of claim 1 wherein the valve actuation member is a push button mounted to the control valve assembly.

3. The perineal treatment apparatus 1 including a coiled spring mounted about a portion of the discharge conduit for resiliently urging the discharge conduit to the non-deployed position thereof.

4. The perineal treatment apparatus of claim 3 in which the coiled spring includes a first end that is anchored to the bracket means for pivotally mounting the discharge conduit to the lower surface of the toilet seat and a second end mounted to the discharge conduit adjacent the agent injector.

5. The perineal treatment apparatus of claim 1 wherein the agent injector includes a port for removably receiving an agent dispensing container.

6. The perineal treatment apparatus of claim 1 wherein the spray nozzle of the discharge conduit is a spray head mounted at a distal end of the discharge conduit.

7. The perineal treatment apparatus of claim 1 wherein the discharge conduit includes a curved outer portion that connects at an outer end to the spray nozzle, and the curved outer portion extending from an L-shaped portion that connects the agent injector and the control valve assembly to the curved outer portion.

8. The perineal treatment apparatus of claim 7 wherein the liquid input conduit is formed of a flexible material such that the input conduit is movable with the control valve assembly when the control valve assembly is used as a handle to manipulate the discharge conduit.

9. The perineal treatment apparatus of claim 7 wherein the agent injector is mounted intermediate the control valve assembly and the L-shaped portion of the discharge conduit.

10. The perineal treatment apparatus of claim 9 wherein the agent injector includes a housing having a flow passageway there through from an input end to an outlet end, a venturi forming a portion of the flow passageway, and a port for communicating a dispensing container with the venturi whereby an agent within the dispensing container may be entrained in liquid flowing through the flow passageway.

11. The perineal treatment apparatus of claim 10 wherein the agent injector includes a slit valve mounted within the port.

12. The perineal treatment apparatus of claim 10 further including a metering valve for metering an agent flowing from the dispensing container toward the venturi through the port.

13. The perineal treatment apparatus of claim 10 wherein the discharge conduit and the control valve assembly are adjustably mounted to one another by a swivel attachment connecting the discharge conduit relative to the control valve assembly so that the discharge conduit and agent injector may be rotated substantially 180° relative to the handle to thereby permit the perineal treatment apparatus to be selectively and removably mounted to either a left or right side of the toilet seat.

14. The perineal treatment apparatus of claim 2 wherein the agent injector includes a housing having a flow passageway there through from an input end to an outlet end, a venturi forming a portion of the flow passageway, and a port for communicating an agent dispensing container with the venturi whereby an agent within the dispensing container may be entrained in liquid flowing through the flow passageway.

15. The perineal treatment apparatus of claim 14 wherein the agent injector includes a slit valve member mounted within the port.

16. The perineal treatment apparatus of claim 1 wherein the agent injector includes a housing having a flow passageway there through from an input end to an outlet end, a venturi forming a portion of the flow passageway, and a port communicating an agent dispensing container with the venturi whereby an agent from the dispensing container may be entrained in liquid flowing through the passageway.

17. The perineal treatment apparatus of claim 16 wherein the agent injector includes a slit valve member mounted within the port.

18. The perineal treatment apparatus of claim 16 wherein the discharge conduit and the control valve assembly are adjustably mounted to one another by a swivel attachment for adjustably connecting the discharge conduit and agent injector relative to the control valve assembly so that the discharge conduit and agent injector may be rotated substantially 180° relative to the handle to thereby permit the perineal treatment apparatus to be selectively and removably mounted to either a left or right side of the toilet seat.

19. The perineal treatment apparatus of claim 1 wherein the discharge conduit and the control valve assembly are adjustably mounted to one another by a swivel fitting for adjustably connecting the discharge conduit relative to the control valve assembly so that the discharge conduit may be rotated substantially 180° relative to the handle to thereby permit the perineal treatment apparatus to be selectively and removably mounted to either a left or right side of the toilet seat.

20. The perineal treatment apparatus of claim 16 including a metering valve for metering an agent flowing from the agent dispensing container toward the venturi through the port.

* * * * *